(12) United States Patent
Soldo

(10) Patent No.: US 7,158,907 B1
(45) Date of Patent: Jan. 2, 2007

(54) SYSTEMS AND METHODS FOR CONFIGURING A TEST SETUP

(75) Inventor: Monnett Soldo, Sunnyvale, CA (US)

(73) Assignee: Spirent Communications, Rockville, MD (US)

( * ) Notice: Subject to any disclaimer, the term of this patent is extended or adjusted under 35 U.S.C. 154(b) by 122 days.

(21) Appl. No.: 10/912,613

(22) Filed: Aug. 4, 2004

(51) Int. Cl.
*G01D 3/00* (2006.01)

(52) U.S. Cl. .................................. 702/108; 712/15

(58) Field of Classification Search ............... 702/108, 702/1, 85, 127, 59; 707/102; 712/15
See application file for complete search history.

(56) References Cited

U.S. PATENT DOCUMENTS 5,953,684 A * 9/1999 Alexander .................. 702/108
6,788,077 B1 * 9/2004 Hamdan ..................... 324/726

OTHER PUBLICATIONS

Author unknown, "Configuring and Building Tests, Creating a New Test," *Spirent Avalanche User Guide*, Chapter 3, date unknown.

* cited by examiner

*Primary Examiner*—Edward Raymond
(74) *Attorney, Agent, or Firm*—Martine Penilla & Gencarella, LLP

(57) ABSTRACT

Methods for configuring a test setup that support reuse of previously defined sub-configuration parameter values without reference to individually-named sub-configuration files are provided. In these methods, each sub-configuration parameter value is automatically associated with a test case name within the test, and this association is represented in context data structures. During test configuration, for each set of sub-configuration parameter values, the user may reuse previously-defined values simply by specifying the name of the test associated with the previously-defined values. A system and a user interface for configuring a test setup are also described.

18 Claims, 7 Drawing Sheets

TEST CASE A — 312

| TEST CASE A | |
|---|---|
| Load Profile | Step Steady Time XXZ |
| Load Profile | Step Steady Time XYZ |
| Load Profile | Step Height XZA |
| Network Topology | Sub-configuration parameter value XYX |
| Network Topology | Sub-configuration parameter value YYY |
| Network Topology | Sub-configuration parameter value ZZZ |
| Traffic Mix | Sub-configuration parameter value XYZ |
| ⋮ | |

FIG. 4A

| TEST CASE A | |
|---|---|
| Load Profile | Link to Step Ramp Time XXZ |
| Load Profile | Link to Step Steady Time XYZ |
| Load Profile | Link to Step Height XZA |
| Network Topology | Link Sub-configuration parameter value XYX |
| Network Topology | Link Sub-configuration parameter value YYY |
| Network Topology | Link Sub-configuration parameter value ZZZ |
| Traffic Mix | Link Sub-configuration parameter value XYZ |
| ⋮ | |

FIG. 4B

| Column A 404 | Column B 404 | Column C 407 | |
|---|---|---|---|
| Test Case A | Context 1 | Sub-configuration parameter value XXZ | ⎫ |
| Test Case A | Context 1 | Link to Sub-configuration parameter value XYZ | ⎬ 312 |
| Test Case A | Context 1 | Sub-configuration parameter value XZA | ⎭ |
| Test Case B | Context 2 | Sub-configuration parameter value URS | |
| Test Case F | Context 1 | Link to Sub-configuration parameter value XYZ | ⎫ |
| Test Case F | Context 1 | Sub-configuration parameter value XYZ' | ⎬ 318 |
| Test Case F | Context 1 | Sub-configuration parameter value XZA | |
| Test Case F | Context 3 | Sub-configuration parameter value VVA | ⎭ |
| ⋮ | | | |

FIG. 4C

SYSTEMS AND METHODS FOR CONFIGURING A TEST SETUP

BACKGROUND OF THE INVENTION

1. Field of the Invention

The present invention relates to testing devices and services and, more particularly, to systems and methods for configuring a test setup for devices and services under test.

2. Description of the Related Art

Typically, after a device (e.g., a communication device) or service (e.g., electronic commerce websites, or services provided by internet service providers) is designed or installed, the device or service needs to be tested, and a test tool (e.g., internet protocol (IP) telephony testing systems, optical fiber emulators, data link simulators, etc.) may be used to test the device or service. Typical features of the device or service that can be tested include reliability, stability, recoverability, performance, etc.

To setup a test, a user needs to configure the test tool (e.g., specifying what ports to use) and define the test details (e.g., traffic to be generated). One method to configure the test tool is through the use of specialized test software. Essentially, the test software exercises the device or service by sending traffic and taking actions based on the user's test configurations. FIG. 1A shows a conventional interface provided by the test software that allows the user to configure the test tool. As shown in FIG. 1A, the user may define sub-configuration parameter (e.g., subnet description, network/netmask, internet protocol (IP) address range, etc.) to configure a sub-network. To define the values of the sub-configuration parameters, the user may manually input the values. Alternatively, the user may reuse sub-configuration parameter values that were previously defined and saved in a sub-configuration file. To reuse sub-configuration parameter values, the user chooses the name of the sub-configuration file from the interface. Subsequently, the sub-configuration file is loaded and the sub-configuration parameter values stored in the sub-configuration file are populated into the interface.

The disadvantage with using named sub-configuration files is that the user often has problems recalling and recognizing what sub-configuration parameters and associated sub-configuration parameter values are stored in the sub-configuration file based on the name of the sub-configuration file. The user can assign any name to the sub-configuration file and, as a result, the name of the sub-configuration file is often not organized. For example, FIGS. 1A and 1B show some exemplary names 110 of sub-configuration files, such as "Bandwidth_User," "OpenConns_User0," "RTSP_User," "if0_Bandwidth," "if0_RTSP," etc. The names 110 are difficult to understand because they are abbreviated and not organized in any manner. Such cryptic and unorganized names are confusing and, as the user's memory fades over time, the names become less meaningful.

Additionally, more than one user may create sub-configuration files. As a result, different users may assign different names to sub-configuration files with identical sub-configuration parameters and associated sub-configuration parameter values. The repetition of sub-configuration files with the same content adds to the number of stored sub-configuration files, and a large number of sub-configuration files only makes the identification of sub-configuration files more difficult.

In view of the foregoing, there is a need to provide systems, methods, and user interfaces that make the test setup of devices easier and more efficient for the user.

SUMMARY OF THE INVENTION

Broadly speaking, the present invention fills these needs by providing systems and methods for configuring a test setup. It should be appreciated that the present invention can be implemented in numerous ways, including as a process, an apparatus, a system, computer readable media, or a device. Several inventive embodiments of the present invention are described below.

In accordance with a first aspect of the present invention, a method for configuring a test setup is provided. In this method, a first interface for defining a set of first sub-configuration parameter values of a context is provided. A second interface is also provided for specifying a test case name. The test case name is then received in response to the test case name being specified from the second interface. As a result, a set of second sub-configuration parameter values that is associated with the test case name and the context is retrieved by referencing a first context data structure. Thereafter, the test setup is populated with the set of second sub-configuration parameter values retrieved by referencing the first context data structure.

In accordance with a second aspect of the present invention, a method for configuring a test setup is provided. In this method, a first interface is provided for defining a set of first sub-configuration parameter values of a context. The set of first sub-configuration parameter values is then received in response to the set of first sub-configuration parameter values being defined from the first interface. A second interface is also provided for defining a test case name and the test case name is received in response to the test case name being specified from the second interface. Subsequently, the set of first sub-configuration parameter values is associated with the test case name.

In accordance with a third aspect of the present invention, a user interface (UI) for configuring a test setup is provided. The UI includes a first interface region that provides access to define a set of sub-configuration parameter values, whereby the first interface region enables input of the sub-configuration parameter values. The UI additionally includes a second interface region that provides access to specify a previously specified test case name, whereby the second interface region enables input of the previously stored test case name to define the sub-configuration parameter values.

In accordance with a fourth aspect of the present invention, a system for configuring a test setup is provided. The system includes a memory for storing a test setup module and a central processing unit for executing the test setup module stored in the memory. The test setup module includes logic for providing a first interface for defining a set of first sub-configuration parameter values of a context; logic for providing a second interface for specifying a test case name; logic for receiving the test case name in response to the test case name being specified from the second interface; logic for retrieving a set of second sub-configuration parameter values that is associated with the test case name and the context by referencing a first context data structure; and logic for populating the test setup with the set of second sub-configuration parameter values retrieved by referencing the first context data structure.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

Figures 1A, 1B:
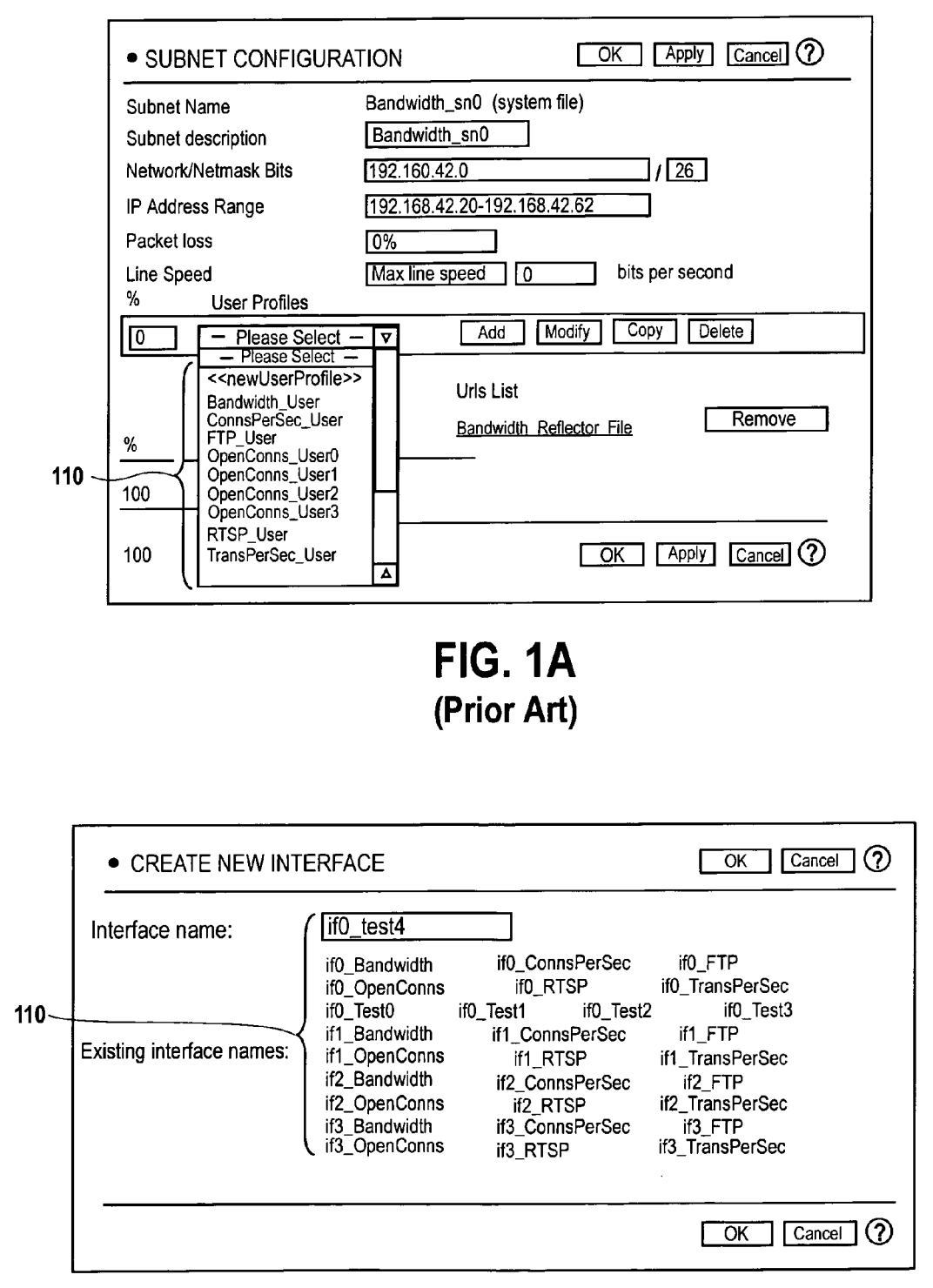

FIG. 1A shows a conventional interface provided by a test software that allows the user to configure a test tool.

FIG. 1B shows a conventional interface with exemplary names of configuration files.

FIGS. 4A, 4B, and 4C are detailed structural diagrams of context data structures, in accordance with one embodiment of the present invention.

DETAILED DESCRIPTION OF THE EXEMPLARY EMBODIMENTS

An invention is disclosed for systems, methods, and user interfaces (UIs) for configuring a test setup for devices or services. Devices include any suitable machines and components that can be tested. Examples of devices include communication devices, medical devices, etc. Exemplary services include services provided by internet service providers or E-commerce companies, network services, etc.

In the following description, numerous specific details are set forth in order to provide a thorough understanding of the present invention. It will be understood however, by one of ordinary skill in the art, that the present invention may be practiced without some or all of these specific details. In other instances, well known process operations have not been described in detail in order not to unnecessarily obscure the present invention.

A test case name is typically easier for a user to recall than a name of a sub-configuration file. As a result, the embodiments described herein provide methods and systems for configuring a test setup by automatically associating one or more sets of sub-configuration parameter values with their test case names, and reusing the sub-configuration parameter values based on the test case names within the appropriate context. In one embodiment, a user interface is provided for defining a set of sub-configuration parameter values. If the user wants to reuse the sub-configuration parameter values that were previously defined within a particular context, the user simply specifies or selects the test case name associated with the previously defined sub-configuration parameter values. As will be explained in more detail below, the sub-configuration parameter values are then retrieved by referencing a context data structure, and the test setup is then populated with the retrieved sub-configuration parameter values.

Figure 2B:
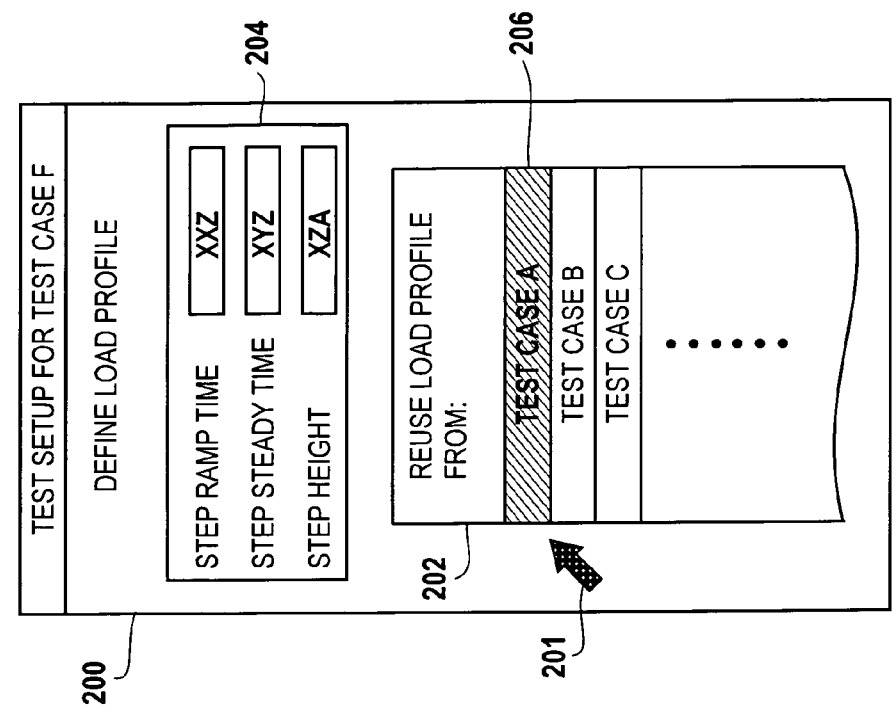
FIGS. 2A and 2B are simplified user interfaces for configuring a test setup for a communication device under test, in accordance with one embodiment of the present invention.
Figure 2A:
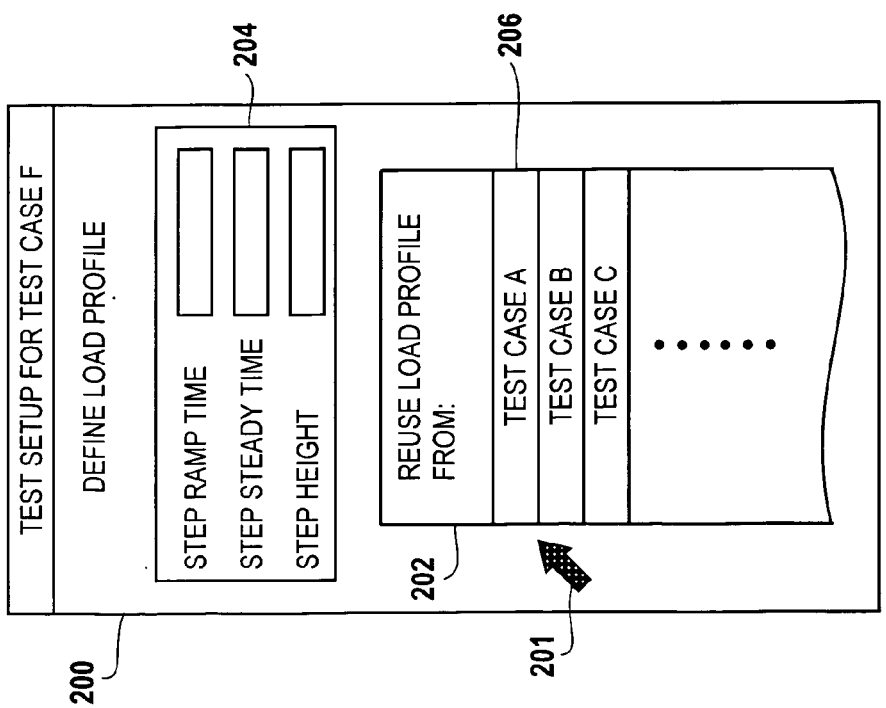

FIGS. 2A and 2B are simplified user interfaces for configuring a test setup for a communication device under test, in accordance with one embodiment of the present invention. Communication device includes any suitable device used in communications. Examples of communication devices include routers, firewalls, remote access servers, Asynchronous Transfer Mode (ATM) switches, broadband equipment, call center equipment, etc.

It should be appreciated that each test configuration includes several different contexts. Exemplary contexts include network topology, traffic mixes, load profiles, etc. A context contains several different sub-configuration parameters. In other words, sub-configuration parameters are grouped into contexts. Exemplary sub-configuration parameters include a step ramp time, a step steady time, a step height time, a holding time, a height, a maximum finishing time, a maximum established TCP connections, a maximum connection rate, a maximum active simulated users, a maximum new simulated users rate, etc. The assigned numerical quantities or textual information of the sub-configuration parameters define the sub-configuration parameter values.

As shown in FIG. 2A, UI 200 allows a user to define sub-configuration parameter values within a load profile context for a test case named Test Case F. User interface 200 includes first interface region 204 that provides access for the user to define sub-configuration parameter values. In other words, first interface region 204 enables the user to input sub-configuration parameters. Additionally, UI 200 includes second interface region 202 that allows the user to specify or select a previously stored test case name instead of defining sub-configuration parameter values from scratch. In other words, second interface region 202 allows the user to input another test case name from which sub-configuration parameter values are to be retrieved.

The user can manually define each load profile sub-configuration parameter value associated with Test Case F. Alternatively, the user can save time by reusing load profile sub-configuration parameter values that were previously defined from other test cases (e.g., Test Case A 206, Test Case B, and Test Case C). To reuse load profile sub-configuration parameter values associated with Test Case A 206, the user simply specifies the Test Case A from second interface region 202. As shown in FIG. 2B, Test Case A 206 can be specified by selecting the Test Case A from a list of test case names with the use of cursor 201. Alternatively, the user may specify Test Case A 206 by typing the name of the test case, such as "Test Case A."

After the user specifies Test Case A 206 from second interface region 202, the load profile sub-configuration parameter values associated with Test Case A, such as Step Ramp Time=XXZ, Step Steady Time=XYZ, and Step Height=XZA, are retrieved and automatically populated into both first interface region 204 and, as will be explained in more detail below, underlying test data structures. As a result, the set of load profile sub-configuration parameter values associated with current Test Case F acquire the same values as the load profile sub-configuration parameter values associated with Test Case A.

Figure 3A:
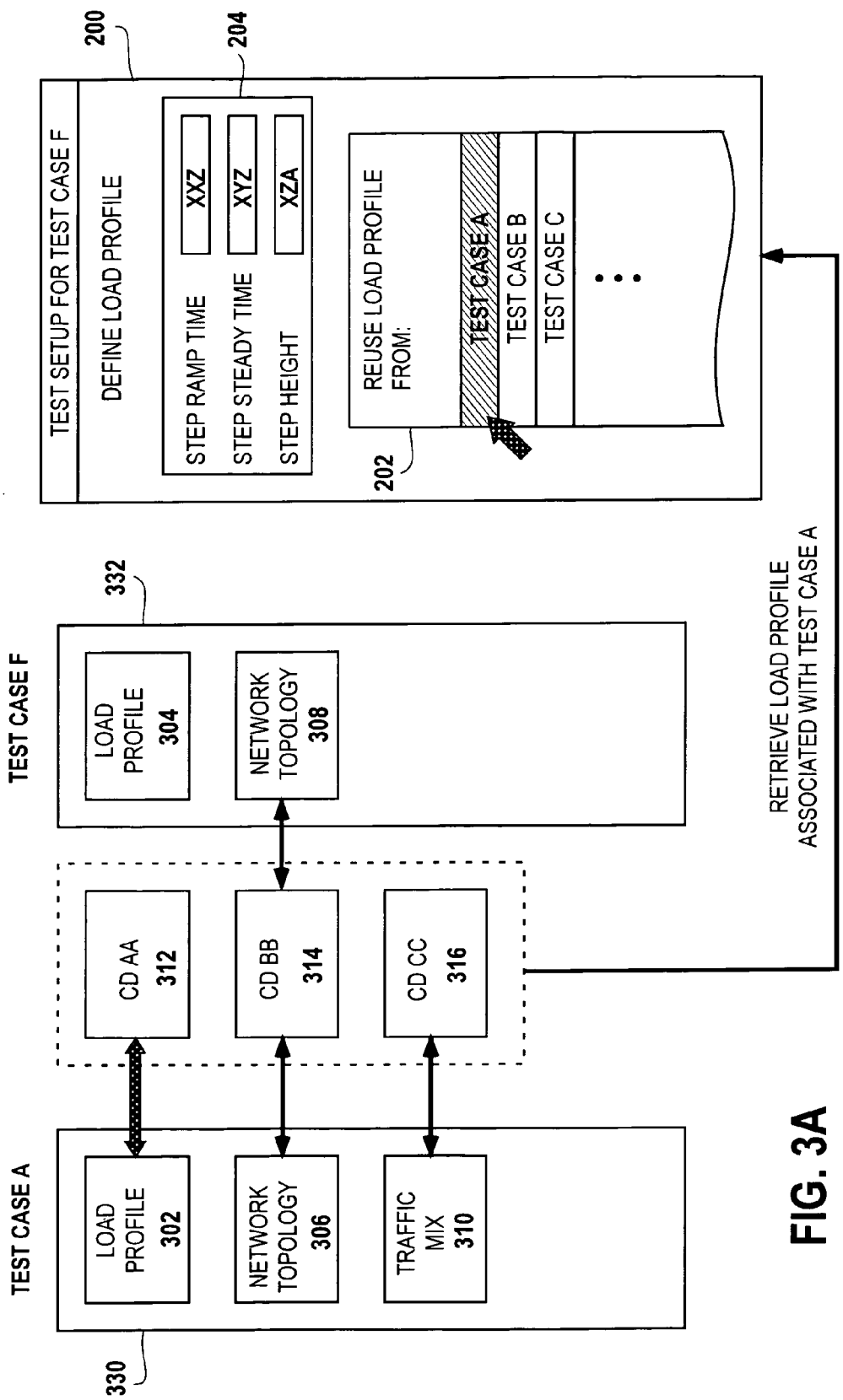
FIG. 3A is a simplified schematic diagram of sub-configuration parameter values being retrieved by referencing a context data structure, in accordance with one embodiment of the present invention.

FIG. 3A is a simplified schematic diagram of sub-configuration parameter values being retrieved by referencing a context data structure, in accordance with one embodiment of the present invention. In addition to UI 200 shown in FIGS. 2A and 2B, FIG. 3A also includes data structures 330 and 332 associated with Test Case A and Test Case F, respectively. Data structures 330 and 332 are files, lists, arrays, databases, data base records, tables, etc. that store or reference sub-configuration parameter values associated with load profiles 302 and 304, network topology 306 and 308, and traffic mix 310. FIG. 3A also shows context data structures such as Context Data Structure (CD) AA 312, CD BB 314, and CD CC 316 that may be referenced to retrieve sets of sub-configuration parameter values. Context data structures 312, 314, and 316 are files, lists, arrays, databases, data base records, tables, etc. that store sub-configuration information. As will be explained in more detail below, sub-configuration information includes any suitable information associated with a sub-configuration parameter. Exemplary sub-configuration information includes a test case name, a sub-configuration parameter value, a link to the sub-configuration parameter value, and a context. The links represent the connections between the sub-configuration parameter values, the test cases that the sub-configuration parameter values participate in, and the specific context within the test. For example, in one embodiment, the link may be a pointer to a sub-configuration parameter value.

As discussed above, a user may populate a test setup with load profile sub-configuration parameter values associated with Test Case A. After the user specifies Test Case A from second interface region 202, the load profile sub-configuration parameter values associated with Test Case A are retrieved by referencing CD AA 312. As will be explained in more detail below, context data structures, such as CD AA 312, CD BB 314, and CD CC 316, store sub-configuration information and may be referenced by name (e.g., Test Case A, Test Case F, etc.) and context (e.g., load profile 302, network topology 306, traffic mix 310, etc.).

In one embodiment, the load profile sub-configuration parameter values associated with Test Case A are copied from load profile 302 to CD AA 312. Here, the load profile sub-configuration parameter values associated with Test Case A are stored and retrieved from CD AA 312. However, in another embodiment, the load profile sub-configuration parameter values associated with Test Case A may not be copied to and stored in CD AA 312. Instead, CD AA 312 may store links that point to the locations of the load profile sub-configuration parameters stored in data structure 330. In yet another embodiment, as will be explained in more detail below, CD AA 312 may store a combination of both the load profile sub-configuration parameter values and links to the load profile sub-configuration parameter values.

As shown in FIG. 3A, in one embodiment, the load profile sub-configuration parameter values associated with Test Case A are stored in load profile 302 of data structure 330. To retrieve the load profile sub-configuration parameter values associated with Test Case A, CD AA 312 is first referenced, and the links stored in the CD AA point to data structure 330 as the storage location of the load profile sub-configuration parameter values associated with Test Case A. The load profile sub-configuration parameter values associated with Test Case A are then retrieved from load profile 302 of data structure 330 and both the Test Case F load profile sub-configuration parameter values and first interface region 204 are populated with the load profile sub-configuration parameter values associated with Test Case A.

Figure 3B:
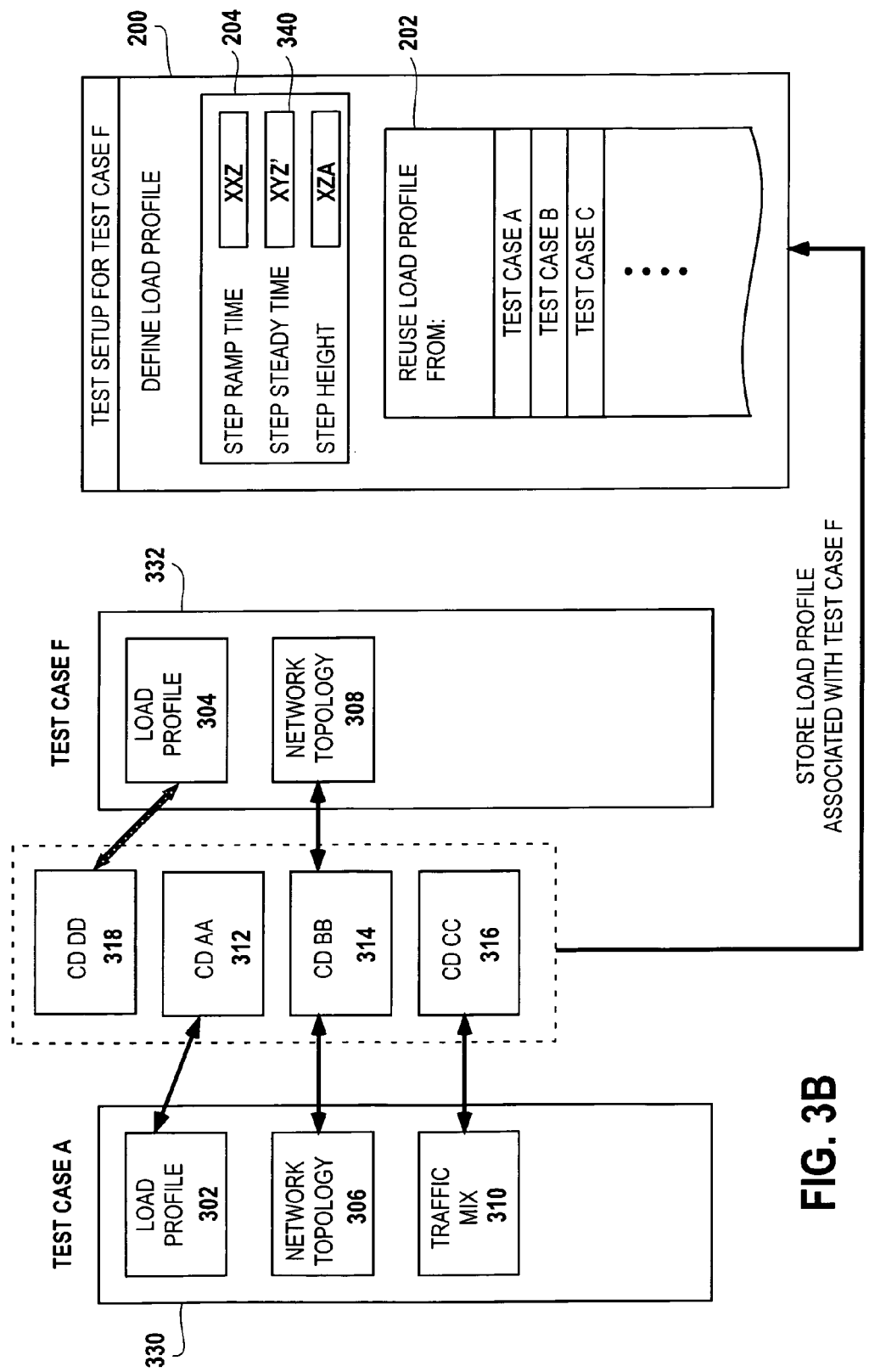
FIG. 3B is a simplified schematic diagram of sub-configuration parameter information being stored in a context data structure, in accordance with one embodiment of the present invention.

FIG. 3B is a simplified schematic diagram of sub-configuration parameter information being stored in a context data structure, in accordance with one embodiment of the present invention. After the load profile sub-configuration parameter values associated with Test Case A are retrieved and populated in first interface region 204, the user may manually modify the load profile sub-configuration parameter values associated with Test Case F. As shown in FIG. 3B, the user modifies a load profile sub-configuration parameter value associated with Test Case F from XYZ to XYZ' 340. As a result, a new CD DD 318 is created that references the initial load profile sub-configuration parameter values from load profile 302, but also records new sub-configuration parameter value XYZ' 340 associated with Test Case F.

FIGS. 4A, 4B, and 4C are detailed structural diagrams of context data structures, in accordance with one embodiment of the present invention. As discussed above, context data structures are files, lists, arrays, databases, data base records, tables, etc. that store sub-configuration information. Sub-configuration information includes any suitable information associated with a sub-configuration parameter. Exemplary sub-configuration information includes a test case name, a sub-configuration parameter value, a link to the sub-configuration parameter value, and a context. An exemplary embodiment of a detailed structural diagram of CD AA 312 shown in FIGS. 3A and 3B is illustrated in FIG. 4A. FIG. 4A shows context data structure 312, in the form of a table, identified as "Test Case A" that stores some sub-configuration information associated with Test Case A. As shown in FIG. 4A, the table includes sub-configuration parameter values (e.g., step ramp time xXZ, sub-configuration parameter value YYY, etc.) and contexts associated with the sub-configuration parameter values (e.g., load profile, network topology, traffic mix, etc.). Alternatively, as shown in FIG. 4B, instead of storing sub-configuration parameter values, links to the sub-configuration parameter values may be stored in the table, in accordance with another embodiment of the present invention.

FIG. 4C shows that the context data structures, such as CD AA 312 and CD DD 318, may also be combined into one database structure 408, in accordance with one embodiment of the present invention. As shown in FIG. 4C, database structure 408 includes three columns 404, 406, and 407. Column C 407 stores the sub-configuration parameter values or links to the sub-configuration parameter values. Column A 404 and column B 406 store the test case names and contexts associated with the sub-configuration parameter values, respectively. Since database structure 408 includes a separate column A 404 that identifies the test case names associated with the sub-configuration parameter values, CD AA 312 and CD DD 318 may then be combined into one database structure 408 instead of having separate tables for each test case.

Figure 5:
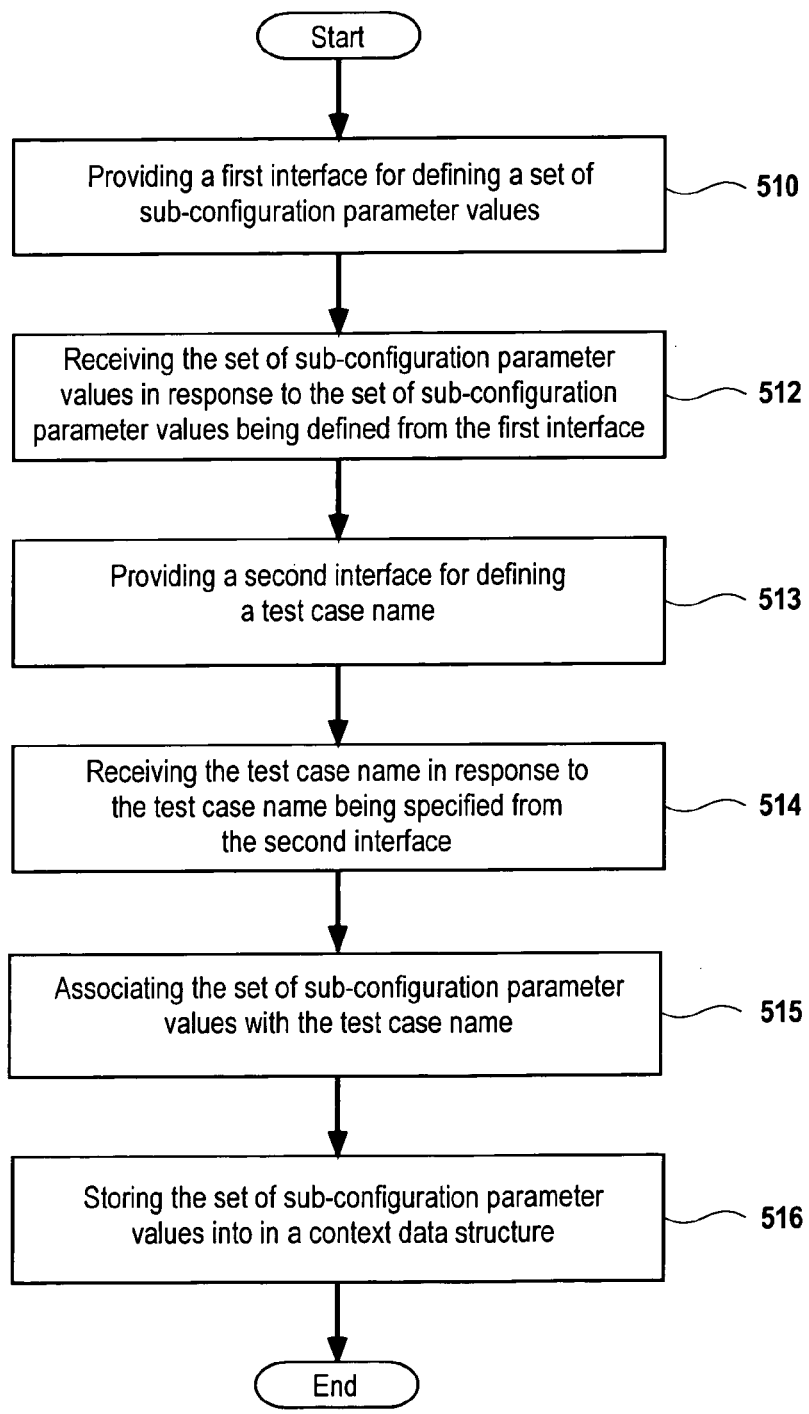
FIG. 5 is a flowchart diagram of the method operations for defining sub-configuration parameter values in configuring a test setup, in accordance with one embodiment of the present invention.

FIG. 5 is a flowchart diagram of the method operations for defining sub-configuration parameter values in configuring a test setup, in accordance with one embodiment of the present invention. Starting in operation 510, a first interface is provided for defining a set of sub-configuration parameter values of a particular context. In operation 512, the set of sub-configuration parameter values is then received in response to the set of sub-configuration values being defined from the first interface. In one embodiment, a user may manually input the set of sub-configuration parameter values to define the sub-configuration parameter values. In another embodiment, as will be explained in more detail below, the user may retrieve a stored set of sub-configuration parameter values by referencing its test case name to define the sub-configuration parameter values.

Subsequently, in operation 513, a second interface is provided for defining a test case name. The user simply inputs a test case name that he wants to associate with the set of sub-configuration parameter values defined in the first interface. As a result, the test case name defined by the user is received in operation 514, and the set of sub-configuration parameter values is associated with the test case name in operation 515. In one embodiment, the set of sub-configuration parameter values may than be stored into a context data structure in operation 516. Sub-configuration parameter information associated with the set of sub-configuration parameter values (e.g., associated test case names, associated contexts, etc.) may also be stored in the context data structure.

Figure 6:
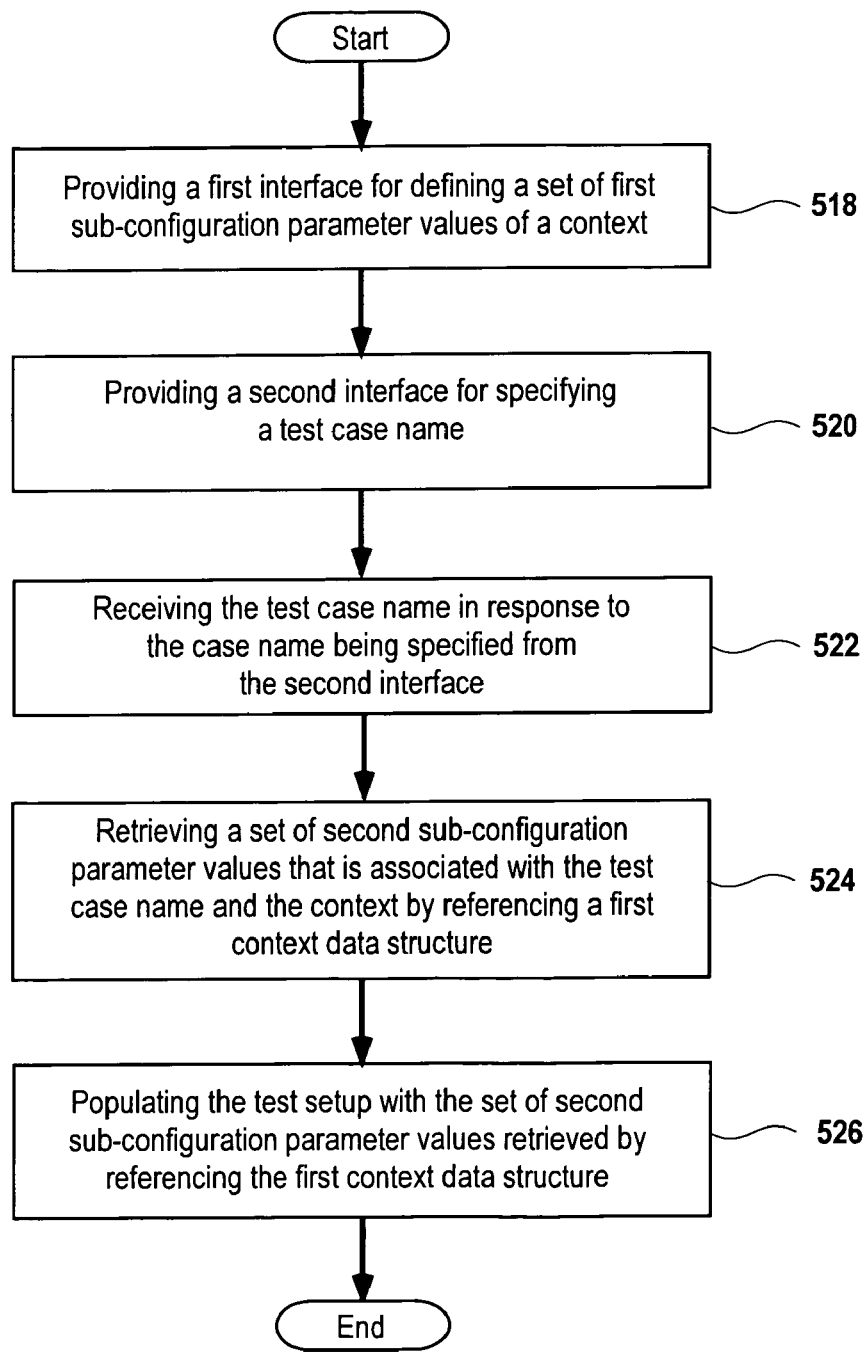
FIG. 6 is a flowchart diagram of the method operations for retrieving a previously defined set of sub-configuration parameter values in configuring a test setup, in accordance with one embodiment of the present invention.

FIG. 6 is a flowchart diagram of the method operations for retrieving a previously defined set of sub-configuration parameter values in configuring a test setup, in accordance with one embodiment of the present invention. After a set of sub-configuration parameter values associated with a test case name has been defined and stored, the sub-configuration parameter values may later be retrieved by referencing the test case name of the set of sub-configuration parameter values. Starting in operation 518, a first interface is provided for defining a set of first sub-configuration parameter values of a particular context. A second interface is additionally provided in operation 520 for specifying a test case name. The test case name is then received in operation 522 in response to the test case name being specified from the second interface. As a result, in operation 524, a set of second sub-configuration parameter values that is associated with the test case name and the context is retrieved by referencing a first context data structure.

Thereafter, the test setup is populated with the set of second sub-configuration parameter values retrieved by referencing the first context data structure in operation 526. There are several embodiments to populate the test setup. In one embodiment, the first interface is populated with the set of second sub-configuration parameter values retrieved by referencing the first context data structure. The population of the first interface enables the set of first sub-configuration parameter values to be defined by the retrieved set of second sub-configuration parameter values. In other words, by retrieving the set of second sub-configuration parameter values, the first sub-configuration parameter values acquire the values of the second sub-configuration parameters. In another embodiment, to populate the test setup, the set of second sub-configuration parameter values is copied into a second context data structure. Thereafter, the first interface is populated with the set of second sub-configuration parameter values retrieved from the second context data structure.

The functionality described above for configuring the test setup may be incorporated into a system. In one exemplary embodiment, the system includes a central processing unit (CPU) and a memory. The CPU is in communication with the memory. The memory stores a test setup module that includes the logic to configure the test setup. For example, in one embodiment, the test setup module includes the logic for providing a first interface for defining a set of first sub-configuration parameter values of a context; logic for providing a second interface for specifying a test case name; logic for receiving the test case name in response to the test case name being specified from the second interface; logic for retrieving a set of second sub-configuration parameter values that is associated with the test case name and the context by referencing a first context data structure; and logic for populating the test setup with the set of second sub-configuration parameter values retrieved by referencing the first context data structure.

In the embodiments described above, a user defines sub-configuration parameter values and specifies test case names through inputs into user interfaces. Inputs can take a variety of forms. For example, the user may define sub-configuration parameter values and specify test case names from commands the user enters from a keyboard. Alternatively, the user may define sub-configuration parameter values and specify test case names interactively by voice. Any number of suitable layouts can be designed for the user interface layouts illustrated above as FIGS. 2A, 2B, 3A, and 3B do not represent all possible layout options available. The displayable appearance of the interfaces can be defined by any suitable geometric shape (e.g., rectangle, square, circle, triangle, etc.), alphanumeric character (e.g., A,v,t,Q, 1,9,10, etc.), symbol (e.g., $, *, @, α, #, ¤, ♥, etc.), shading, pattern (e.g., solid, hatch, stripes, dots, etc.), and color. Furthermore, for example, interface regions 204 and 206 in FIGS. 2A, 2B, 3A, and 3B, or any other interface regions, may be omitted or dynamically assigned. It should also be appreciated that the interface regions can be fixed or customizable. In addition, the test system may have a fixed set of layouts, utilize a defined protocol or language to define a layout, or an external structure can be reported to the test system that defines a layout. Finally, selecting on an interface region of UI as discussed above triggers code to cause the functionality described herein.

In sum, the above described invention provides systems, methods, and UIs to configure a test setup for devices and services under test. Instead of having a user assign random names to each configuration file, the sub-configuration parameter values are automatically associated with a test case name. As such, when a user wants to reuse the previously defined sub-configuration parameter values, the user merely needs to refer to the test case name. Since the user would most likely remember one test case name instead of the myriad of configuration file names, the association of sub-configuration parameter values with test case names greatly simplifies identification of sub-configuration parameters for the user. Additionally, the above described invention simplifies the steps for the user to save sub-configuration parameter values because the above described invention eliminates the additional step of creating a configuration file name for each set of sub-configuration parameter values within a context. As a result, the elimination of the additional step of creating the configuration file name and the retrieval of the previously defined sub-configuration parameter values by their test case names significantly simplify and make more efficient the definition of sub-configuration parameter values by the user in the test setup.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for configuring a test setup, said method comprising:
   providing a first interface to define first sub-configuration parameter values associated with a first load file corresponding to a first test case;
   providing a second interface for specifying a test case name to access a second load file containing second sub-configuration parameter values corresponding to a second test case;
   populating the first interface with one of the second sub-configuration parameter values retrieved by referencing the second context data structure, defining populated values;
   generating, from said populated values, a first context data structure to associate the first sub-configuration parameter values, associated with the first load file, and second sub-configuration values, stored in the second load profile, with the first test case; and
   storing the first context data structure in a memory.

2. The method of claim 1, wherein populating further includes,
   populating by referencing the second context data structure, with the first sub-configuration parameter values being defined by modifications to one of the populated values.

3. The method of claim 1, wherein populating further includes,
   populating the first interface with the second sub-configuration parameter values retrieved from the second context data structure and modifying one of the populated values in the first interface, defining a modified value and storing the modified value in the first context data structure.

4. The method of claim 1, further including defining the first sub-configuration parameter values defined by modifications to one of the populated; and
   storing one of the first sub-configuration parameter values in the first context data structure.

5. The method of claim 4, wherein links to a sub-group of the first sub-configuration parameter values are stored in the first context data structure.

6. The method of claim 1, wherein each of the first and second sub-configuration parameter values are defined by one or more of a subnet description value, an internet protocol (IP) address range value, a step ramp time value, a step steady time value, and a step height value.

7. The method of claim 1, wherein the first sub-configuration parameter values are associated with a context defined by one or more of, a network topology, and a traffic mix.

8. The method of claim 1, wherein the second context data structure is defined by one or more of a file, a list, an array, a database, and a table.

9. The method of claim 1, wherein the first context data structure includes one or more of, a link to the sub-configuration parameter value, a test case name associated with the sub-configuration parameter value, and a context associated with the sub-configuration parameter value.

10. A method for configuring a test setup, said method comprising:
    providing a first interface region associated with a first load profile file having a plurality of first sub-configuration parameter values corresponding to a first test case;
    providing a second interface region associated with a second load profile file corresponding to a second test case;
    generating a context data structure to associate, with said second load profile, a subset of said plurality of first sub-configuration parameter values, defining a second set of sub-configuration parameters values associated with the second load profile file;
    storing the first context data structure in a memory.

11. The method as recited in claim 10 wherein generating further includes forming said context data structure to associate the subset and user modified parameters.

12. The method as recited in claim 10 further including providing a user interface (UI) displaying said first interface region and said second interface region and populating a sub-portion of said second interface region with indicia corresponding to said first sub-configuration parameter and modifying said indicia, with generating further including with said forming said context data structure to associate said subset of said plurality of first sub-configuration parameter values and information corresponding to said modified indicia.

13. A method for configuring a test setup, said method comprising:
    providing a first interface region corresponding to a first test case, said first test case being associated with a first load file;
    providing a second interface region corresponding to a second test case, said second test case being associated with a second load file including second sub-configuration information;
    populating said first interface region with a sub-portion of the second sub-configuration information, defining populated parameter information;

varying the populated parameter information, defining a varied parameter, with the remaining populated parameter information defining original second test case information;

generating, in response to varying, a context data structure associated with the first test case to associate, with the first load file, second sub-configuration parameter information matching the original second test case information and the varied parameter, the second configuration parameter information matching the original second test case information and the varied parameter defining first sub-configuration parameter information; and storing the first context data structure in a memory.

14. The method of claim 13, further including associating a name with the first test case and populating the first interface region with the first sub-configuration parameter information by inputting the name into the first interface region.

15. The method of claim 13 further including associating a name with the first test case and before populating, displaying the name in the first interface region.

16. The method of claim 13 wherein the first sub-configuration parameter information is defined by one or more of first sub-configuration parameter value, a link to the first sub-configuration parameter value, the context associated with the first sub-configuration parameter value, and a name of the first test case.

17. The method of claim 13 wherein the first sub-configuration parameter information is defined by one or more of a subnet description value, an internet protocol (IP) address range value, a step ramp time value, a step steady time value, and a step height value.

18. A system for configuring a test setup, comprising:

a display;

a processor in data communication with the display; and a memory in data communication with the processor, the memory storing computer-readable instructions to be operated on by the processor to render, on the display, a first interface region and a second interface region, with the first interface region corresponding to a first test case associated with a first load file stored in memory and the second interface region corresponding to a second test case associated with a second load file having second sub-configuration information stored in the memory; computer readable instructions to render in the first interface region with a sub-portion of the second sub-configuration information, defining populated parameter information; and computer-readable instructions to generate, in response to changes in the populated parameter information, a context data structure associated with the first test case, with the context data structure being associated with, second sub-configuration parameter information matching populated parameter information and storing, in the memory, the populated parameter information that differs from the second sub-configuration parameter information.

* * * * *